United States Patent [19]
Hill et al.

[11] Patent Number: 5,154,856
[45] Date of Patent: Oct. 13, 1992

[54] PROCESS FOR CONTROLLING AQUEOUS MEDIA FOAM EMPLOYING ALKADIENE ETHERS OF SUGARS OR ALKYL GLUCOSIDES

[75] Inventors: Karlheinz Hill, Santa Rosa, Calif.; Ulrike Mahler, Duesseldorf, Fed. Rep. of Germany

[73] Assignees: Henkel Kommanditgesellschaft auf Aktien, Duesseldorf-Holthausen; Zucker-Aktiengesellschaft, Uelzen, both of Fed. Rep. of Germany

[21] Appl. No.: 558,721

[22] Filed: Jul. 27, 1990

[51] Int. Cl.⁵ ............... B01D 19/04; C07C 43/14; C07C 41/05
[52] U.S. Cl. ................... 252/321; 252/358; 568/687
[58] Field of Search ............ 252/321, 358; 568/687, 568/616, 624

[56] References Cited

U.S. PATENT DOCUMENTS

| H171 | 12/1986 | McDaniel, Jr. et al. | 252/DIG. 1 X |
|------|---------|----------------------|--------------|
| 2,235,790 | 9/1939 | White | 536/18.4 X |
| 4,834,903 | 5/1989 | Roth et al. | 252/351 X |
| 4,996,306 | 2/1991 | McDaniel, Jr. et al. | 536/18.6 |

FOREIGN PATENT DOCUMENTS

WO90/13345  11/1990  World Int. Prop. O. .......... 258/358

OTHER PUBLICATIONS

Derwent Abstract, 90-125515/17 (corresponding to EP-364852-A).

*Primary Examiner*—Robert L. Stoll
*Assistant Examiner*—Daniel S. Metzmaier
*Attorney, Agent, or Firm*—Ernest G. Szoke; Wayne C. Jaeschke; John E. Drach

[57] ABSTRACT

Alkadienyl ethers of monosaccharides, disaccharides, and alkyl glucosides are used as foam controllers and foam inhibitors in aqueous systems.

19 Claims, No Drawings

PROCESS FOR CONTROLLING AQUEOUS MEDIA FOAM EMPLOYING ALKADIENE ETHERS OF SUGARS OR ALKYL GLUCOSIDES

BACKGROUND OF THE INVENTION

1. Field of the Invention

The invention relates to a process for controlling foam in aqueous media. More specifically, the invention relates to a process for controlling foam using alkadienyl ethers of sugars and sugar derivatives.

2. Description of the Related Art

In many branches of industry, the control and prevention of foam development plays an important role to guarantee a smooth manufacturing process and perfect products. The foams developing due to the presence of surface-active substances are especially disturbing in waste water treatment, manufacturing and use of dispersion dyes, bleaching and dyeing of textiles, enzymatic processes, textile and paper printing, paper manufacturing, as well as preparation of sugar beets. Foam problems can be prevented by adding foam inhibitors before foam develops, or existing foam can be destroyed by adding defoamers. Both foam inhibitors and defoamers comprise anti-foaming agents in this sense.

It is expected of anti-foaming agents that they will be effective and exhibit long-term efficacy when used in small quantities. In addition, for use in the food sector, they must be odorless, tasteless, physiologically safe, and removable during processing of the food product. Since anti-foaming agents usually enter the waste water, they should also be readily bio-degradable. Previously, polyalkylene glycols or fatty acids of poly-alkylene glycols have been used as foam inhibitors and defoamers. A number of typical anti-foaming agents with patent citations and application areas are presented in Ullmann's Encyclopedia of Industrial Chemistry (Ullmanns Encyklopädie der techn. Chemie), Vol. 20 (4th new and expanded edition), 1981, pp. 412–414.

The relatively slow biodegradability of propoxylated anti-foaming agents has been found to be a disadvantage. To be sure, ethoxylated products are more readily biodegradable, but as a result of their manufacturing process, they sometimes contain very small amounts of dioxane. Although a large number of anti-foaming agents are available, the expert continues to have a need for such agents that show improved long-term efficacy.

The present invention provides potentially biodegradable anti-foaming or foam-controlling agents which are effective in the short term and maintain their efficacy over extended periods when used in small quantities.

SUMMARY OF THE INVENTION

The present invention provides a process for controlling foam in an aqueous medium comprising adding to said aqueous medium a foam-controlling amount of a composition comprised of a mixture of alkadienyl ethers of a monosaccharide, a disaccharide, or an alkyl glucoside.

DESCRIPTION OF THE PREFERRED EMBODIMENTS

A process for controlling foam in an aqueous medium is provided according to the present invention which comprises adding to the aqueous medium a foam-controlling amount of a composition comprised of a mixture of alkadienyl ethers of a monosaccharide, a disaccharide, or an alkyl glucoside. The term alkadienyl ether is used herein to mean all possible stereo isomers and structural isomers of 1- and 3-substituted octadienyl ethers and nonadienyl ethers that can be made by telomerizing 1,3-butadiene, dimethylbutadiene, isoprene (2-methyl-1,3-butadiene), piperylene (1,3-pentadiene), 1,3-hexadiene, 2,4-hexadiene, chloroprene, 1-cyclohexyl-1,3-butadiene, 1-phenyl-1,3-butadiene, 2,4-octadiene, 3-methylpiperylene, 2-methyl-2,4-pentadiene, 1,3-cyclohexadiene, and 1,3-cyclooctadiene and a mono- or disaccharide. The term octadienyl ether is defined as above because the ethers useful according to the present invention are conveniently and preferably made by telomerization of a conjugated diene with a mono- or disaccharide. It is understood that the term alkadienyl ethers extends to all possible stereo isomers and structural isomers of 1- and 3-substituted alkadienyl ethers made in the telomerization process. For example, the product of the telomerization of 1,3-butadiene may contain a mixture of cis and trans and other diasteriomeric 1-substituted-2,7-octadienyl ether and 3-substituted-1,7-octadienyl ether. In the telomerization of piperylene and isoprene the product can contain at least 16 compounds because each diene can dimerize in 4 different ways (head-to-head, head-to-tail, tail-to-head, tail-to-tail) and each of the possible dimers can either be 1- or 3-substituted. Cis and trans isomers of each of the 16 possible compounds can also be formed in the telomerizations of isoprene and piperylene.

A specific mixture of etherified mono-saccharides, disaccharides, or alkyl glucosides can be identified according to its degree of etherification. The degree of etherification of a sample of etherified carbohydrate is a weighted average of the degree of etherification of all of the components of the sample. Therefore, the average of the degree of etherification can have an integer or non-integer value. The degree of etherification of a sample of octadienyl ethers of a monosachharide can range from 1.0 to about 5.0; from 1.0 to 8.0 in the case of a disaccharide and from 1.0 to about 4.0 in the case of an alkyl glucoside.

Mixtures containing any monosaccharide etherified by one or more alkadienyl groups can be used in the process according to the invention. Mixtures of such etherified monosaccharides as ribose, arabinose, xylose, lyxose, allose, altrose, mannose, gulose, idose, galactose, talose, fructose, sorbose, and especially preferably glucose can be used. Mixtures containing any disaccharide etherified by one or more alkadienyl groups can also be used in the process according to the invention. Mixtures of such etherified disaccharides as sucrose, saccharose, maltose, cellobiose, lactose and/or isomaltose are particularly useful. The most preferred disaccharide is sucrose.

Mixtures containing any alkyl glucoside etherified by one or more alkadienyl groups can be used in the process according to the invention. An alkyl glucoside is a compound of the formula I

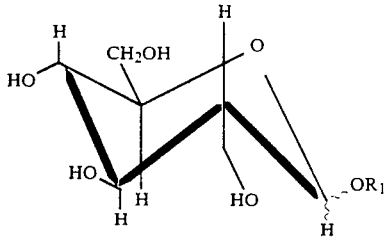

wherein $R_1$ is an alkyl or alkenyl group having from 1 to 25 carbon atoms. The preferred glucosides are methyl, butyl, and oleyl wherein $R_1$ in formula I is methyl, butyl and oleyl respectively. The alkadienyl ethers of the alkyl glucosides are etherified at the 2, 3, 4, or 6 hydroxyl groups depending upon the degree of etherification. For example, a mono alkadienyl ether of a glucoside of formula I can be etherified at either the 2, 3, 4, or 6 OH. A di alkadienyl ether can be etherified at any combination of two of the 2, 3, 4, or 6 OH. Also suitable are alkyl glucosides wherein $R_1$ is an alkyl residue of alcohol mixtures of saturated and/or un-saturated C8/C10, C10/C12, C12/C14 or C12/C13 alcohols.

The present invention also contemplates the use of a single mono- or polyetherified monosaccharide, disaccharide, or alkyl glucoside as the foam-controlling agent useful in the process according to the invention. The preparation of all of the alkadienyl ethers according to the invention has been disclosed in copending patent application Ser. No. 07/517,990 filed on May 2, 1990 the contents of which are incorporated herein by reference.

One preferred foam-controlling composition is a mixture comprised of glucose, glucose mono-octadienyl ether, glucose di-octadienyl ether, glucose tri-octadienyl ether, glucose tetra-octadienyl ether, and glucose penta-octadienyl ether. Another preferred foam-controlling composition is a mixture comprised of sucrose, sucrose mono-octadienyl ether, sucrose di-octadienyl ether, sucrose tri-octadienyl ether, sucrose tetra-octadienyl ether, and sucrose penta-octadienyl ether, sucrose hexa-octadienyl ether, and sucrose hepta-octadienyl ether, and sucrose octa-octadienyl ether. Another preferred foam-controlling composition is comprised of a mixture of the 1- and 3-substituted octadienyl ethers that can be made by telomerizing 1,3-butadiene with sufficient glucose so that the telomerized product contains a mixture of glucose octadienyl ethers having an average degree of etherification of from about 1.0 to about 3.5 and more preferably from about 1.5 to about 2.5.

Another preferred foam-controlling composition is comprised of a mixture of the 1- and 3-substituted octadienyl ethers that can be made by telomerizing 1,3-butadiene with sufficient sucrose so that the telomerized product contains a mixture of sucrose octadienyl ethers having an average degree of etherification of from about 1.0 about 7.0 and more preferably from about 1.5 to about 5.5.

Another preferred foam-controlling composition is comprised of methyl glucoside mono-octadienyl ether, methyl glucoside di-octadienyl ether, methyl glucoside tri-octadienyl ether, and methyl glucoside tetra-octadienyl ether. Another preferred foam-controlling composition is comprised of a mixture of the 1- and 3-substituted octadienyl ethers that can be made by telomerizing 1,3-butadiene with sufficient methyl glucoside so that the telomerized product contains a mixture of methyl glucoside octadienyl ethers having an average having a degree of etherification of from about 1.5 to about 3.5 and more preferably about 2.2. Yet another preferred foam-controlling composition is comprised of glucose di-octadienyl ether and glucose tri-octadienyl ether. Another preferred foam-controlling composition is comprised of sucrose tetra-octadienyl ether and sucrose penta-octadienyl ether. Another preferred foam-controlling composition is comprised of methyl glucoside di-octadienyl ether and methyl glucoside tri-octadienyl ether.

The alkadienyl ethers particularly preferred for use in the foam-controlling process according to the invention as those made by telomerization of 1,3-butadiene, dimethyl butadiene, isoprene, 1,3-hexadiene, chloroprene, 1-cyclohexyl-1,3-butadiene, 1,3-cyclohexadiene and/or 1,3-cyclooctadiene with glucose and sucrose. The most preferred diene is 1,3-butadiene.

In accordance with the invention, telomers are preferred which exist as liquids at room temperature. In principle, solid telomers can also be used as anti-foamers, e.g., in the form of a dispersion. For metering and for optimal mixing with the material to be defoamed, as well as for good wetting of foam bubbles that have already developed, however, liquids are more suitable. Solutions of solid telomers in a solvent may also be used, but they have the drawback that in addition to the solvent, higher addition quantities are also necessary.

Mixtures of etherified sugar compositions with conventional defoamers and/or foam inhibitors, preferably additional foam inhibitors that are liquid at room temperature, like the previously mentioned polyalkylene glycols, may also be used. The term etherified sugar compositions includes etherified monosaccharides, disaccharides, and alkyl glucosides.

The etherified sugar compositions useful according to the invention can be employed in any aqueous medium requiring foam control and/or inhibition. An aqueous medium is an aqueous solution, aqueous-based dispersion, or aqueous-based emulsion. The etherified sugar compositions according to the invention are particularly preferred for use in controlling foam in pulping liquors used in pulp production, in the white water systems of paper machines in paper production and paper coating systems, in fermentation processes such as baker's yeast fermentation broths which contain molasses, in the preparation and processing of sugar beets, in the manufacturing and use of dispersion dyes, and/or in the potato processing industry.

The etherified sugar compositions according to the invention are used in a foam-controlling amount which is any amount necessary to control or inhibit foam formation. A foam-controlling amount will vary with the application and can be easily determined by one of ordinary skill in the art. Typically, the etherified sugar compositions are added to an aqueous liquid in quantities of from about 20 ppm to about 1% based on the weight of material to be defoamed. The foam-controlling amount can be greater than 1% by weight and must be determined on a case-by-case basis. Typically, less than about 1% by weight is required.

The etherified sugar compositions according to the invention act as both foam controllers and foam inhibitors and defoamers and correspondingly may be added before or after the appearance of foam. They show good spontaneous efficacy and, in particular, excellent long-term action as anti-foaming agents. As a result of the excellent long-term action of the telomers as anti-foaming agents, when added just once in the indicated quantities they are able to prevent the reappearance of foam over a long time interval. Constant monitoring of foam that may have developed, or subsequent addition of further quantities is unnecessary in view of the non-continuous nature of the defoaming process. In addition, they can be separated again from the material being defoamed without problems, and because of their lack of odor or taste and their physiologic safety, they can be used as auxiliaries in the food industry. The following examples are meant to illustrate but not limit the invention.

EXAMPLE 1

Telomers of 1,3-butadiene and glucose (degree of etherification 1.5)

In an autoclave (capacity 3.785 L) with a magnetic agitator, 1.733 g ($5.69 \cdot 10^{-3}$ mol) palladium(II) acetyl acetonate, 2.984 g ($1.14 \cdot 10^{-2}$ mol) triphenyl phosphine, 865 g (14.39 mol) isopropanol, 110 g (6.11 mol) water and 1284 g (7.13 mol) anhydrous glucose were placed. The apparatus was evacuated 3 times and purged with nitrogen. Then 768 g (14.22 mol) 1,3-butadiene were added. The autoclave was closed and then held for 3 hr at 75° C. After cooling to room temperature, 1,3-butadiene that had not re-acted away was slowly withdrawn. Then the product mixture was filtered to remove unreacted glucose. Following removal of the solvent, 1.2 kg of a yellow-green, clear solution with the following characteristics was obtained: iodine number 197, hydroxyl number 610, average etherification degree 1.5 (according to NMR). Using the GLC method, the following product distribution (area percentage) was found: glucose 8, monoether 58, diether 29, triether 5; higher degrees of etherification were unable to be detected. The GLC results are based on products derivatized with trimethylsilane under the following conditions: Supelco SPB-5 column; temperature 200°–300° C., increasing by 10° C. per minute.

EXAMPLE 2

Telomer of 1,3-butadiene and glucose (degree of etherification 2.5)

In analogy to Example 1, 0.8685 g (2.85 mmol) palladium(II) acetyl acetonate, 1.495 g (5.7 mmol) triphenyl phosphine, 820 g (13.64 mol) isopropanol, 110 g (6.11 mol) water, 513 g (2.85 mmol) anhydrous glucose and 1385 g (25.65 mol) 1,3-butadiene were reacted. The reaction mixture was held at 65° C. for 10 hr. The reaction mixture was worked up in analogy to Example 1. 1.45 kg of a light yellow-green, clear solution with the following characteristic values was obtained: iodine number 280, hydroxyl number 250, degree of etherification 2.5. According to GLC measurements, the following product distribution exists (area percent): monoether 6, diether 42, triether 52, tetraether, trace.

EXAMPLE 3

Telomers of 1,3-butadiene with sucrose (degree of etherification 5.5)

In analogy to Example 1, 0.7550 g (2.48 mmol) palladium(II) acetyl acetonate, 1.302 g (4.96 mmol) triphenyl phosphine, 820 g (13.64 mol) isopropanol, 110 g (6.11 mol) water, and 510 g (1.1488 mol) sucrose were reacted with 1340 g (24.81 mol) 1,3-butadiene. The reaction mixture was held for 10 hr at 65° C. and worked up in analogy to Example 1. The product was 1.44 kg of a light yellow-green, clear solution with the following characteristic values: iodine number 282, hydroxyl number 160, degree of etherification 5.5. The following product distribution (area percent) was determined by HPLC: monoether 0; diether 0.05; tri-ether 2.24; tetraether 16.3; pentaether 33.1; hexaether 31.9; heptaether 15.8; octaether 0.56. HPLC method: reversed phase, Spherisorb CI, 5 μm, 250×4.6 mm; eluent: mixture of water, acetonitrile, tetrahydrofuran.

EXAMPLE 4

Telomers of methyl glucoside and 1,3-butadiene

In analogy to Example 1, 0.675 g (2.22 mmol) palladium(II) acetyl acetonate, 1.25 g (4.76 mmol) triphenyl phosphine, 820 g (13.64 mol) isopropanol, 75 g (4.17 mol) water, and 525 g (2.71 mol) methyl glucoside were reacted with 1250 g (23.15 mol) 1,3-butadiene. The reaction mixture was held at 70° C. for 10 hr. After workup in analogy to Example 1, 1.3 kg of a light yellow-green, clear solution with the following characteristics was obtained: iodine number 258, hydroxyl number 191, degree of etherification 2.2. The following product distribution (area percent) was determined according to the GLC method: monoether 7, diether 52, triether 39, tetraether 2.

EXAMPLE 5

Testing for Foam Control

About 110 g sugar syrup (sugar beet) and 420 ml water were filled into a 2 L graduated cylinder. Using a laboratory tubing pump with a feed rate of 3 L/min, the solution was drawn up from the bottom of the graduated cylinder with a glass tube. The liquid was returned over a second tube, the lower end of which was positioned at the height of the upper edge of the graduated cylinder. As soon as foam and liquid together reached a volume of 2000 ml, 0.1 ml of the respective anti-foaming agent to be tested was added with a micropipette, and the total volume of foam height and liquid was read after 0.5, 1, 2, 3, 5, 10, 20 and 30 min. In this way the telomers from Examples 1, 2, 3, and 4 were tested at various pH values established by adding calcium hydroxide and at various temperatures. A conventional defoamer was used for comparison. The conventional defoamer is a residue from oxoalcohol synthesis (so-called oxo oil), ethoxylated at 15 wt % and propoxylated at 41 wt %. Table I presents the total volume of liquid and foam height as a function of time, pH, temperature, and the respective anti-foamer added.

TABLE I

| Anti-Foamer Agent According To | | Time In Minutes After Defoamer Addition | | | | | | | | pH | Temperature |
|---|---|---|---|---|---|---|---|---|---|---|---|
| | | ½ | 1' | 2' | 3' | 5' | 10' | 20' | 30' | | |
| Example 2 | 2000 | 640 | 600 | 580 | 560 | 540 | 540 | 540 | 520 | 5.5 | 23° C. |

TABLE I-continued

| Anti-Foamer Agent According To | | Time In Minutes After Defoamer Addition | | | | | | | | pH | Temperature |
|---|---|---|---|---|---|---|---|---|---|---|---|
| | | ½ | 1' | 2' | 3' | 5' | 10' | 20' | 30' | | |
| Example 1 | 2000 | 760 | 680 | 640 | 620 | 580 | 540 | 540 | 540 | 5.5 | 23° C. |
| Example 3 | 2000 | 1060 | 760 | 660 | 620 | 580 | 560 | 560 | 580 | 5.5 | 23° C. |
| Example 4 | 2000 | 1000 | 600 | 580 | 560 | 560 | 540 | 560 | 560 | 5.5 | 23° C. |
| Example 1 | 2000 | 520 | 480 | 460 | 460 | 460 | 480 | 480 | 480 | 10.5 | 23° C. |
| Example 3 | 2000 | 620 | 500 | 460 | 460 | 460 | 460 | 480 | 500 | 10.5 | 23° C. |
| Example 4 | 2000 | 560 | 500 | 460 | 460 | 460 | 480 | 480 | 500 | 10.5 | 23° C. |
| Example 1 | 1800 | 640 | 580 | 560 | 560 | 560 | 560 | 560 | 560 | 5.5 | 50° C. |
| Example 3 | 1800 | 960 | 620 | 580 | 560 | 560 | 560 | 560 | 560 | 5.5 | 50° C. |
| Example 4 | 1800 | 700 | 620 | 580 | 580 | 580 | 600 | 600 | 600 | 5.5 | 50° C. |
| Example 1 | 2000 | 900 | 720 | 660 | 620 | 560 | 540 | 500 | 500 | 5.5 | 0° C. |
| Example 3 | 2000 | 1320 | 1040 | 960 | 740 | 720 | 680 | 660 | 680 | 5.5 | 0° C. |
| Example 4 | 2000 | 920 | 720 | 640 | 620 | 600 | 600 | 580 | 580 | 5.5 | 0° C. |
| Comparison | 2000 | 580 | 540 | 520 | 520 | 520 | 520 | 520 | 540 | 5.5 | 23° C. |
| Examples | 2000 | 500 | 480 | 480 | 480 | 480 | 500 | 520 | 540 | 5.5 | 0° C. |

EXAMPLE 6

In analogy to Example 5, in a 2-liter graduated cylinder, 10 mL of a commercial 1 wt % gelatine solution was mixed with 10 mL of a 2.5% wt % resin glue and 480 mL water. At a total liquid volume plus foam height of 2000 mL, 20 ppm of the telomers according to examples 1, 3 and 4 were added. For comparison, a commercial oleic acid (consisting of 67 wt % C19, 12 wt % linolenic acid, and fractions of longer C chains, treated with 3 wt % ethylene oxide, were added. Table II shows the foam liquid level at ½, 1, 2, 3, 5, 10, 30 and 30 minutes after addition of the defoamer.

TABLE II

| Anti-Foamer from | Blank | Time In Minutes After Defoamer Addition | | | | | | | | pH | Temperature |
|---|---|---|---|---|---|---|---|---|---|---|---|
| | | ½ | 1' | 2' | 3' | 5' | 10' | 20' | 30' | | |
| Example 1 | 2000 | 540 | 520 | 520 | 520 | 540 | 560 | 580 | 600 | 6.5 | 25° C. |
| Example 3 | 2000 | 760 | 580 | 560 | 580 | 600 | 620 | 620 | 640 | 6.5 | 25° C. |
| Example 3 | 2000 | 600 | 560 | 540 | 540 | 540 | 580 | 600 | 640 | 5.5 | 25° C. |
| Comparison | | 1700 | 1600 | 1200 | 800 | 740 | 700 | 700 | 720 | 6.5 | 25° C. |

EXAMPLE 7

About 100 g of a commercial paper coating ink, consisting of binder, hardener, thickener, and pigment slurry, was mixed with 0.5 g of the products according to examples 1, 3 and 4 and agitated for 1 min at 2000 rpm with a dispersing disk. Then a 200 micron thick ink layer was applied to a glass plate with a doctor blade. The applied ink layer was then studied to see whether possible ink flow disturbances were visible. The remaining 80 g of the ink were again mixed with 16 g deionized water and again agitated for 1 min. at 2000 rpm with a dispersing disk. After diluting with water, 50 mL of the ink were weighed into a graduated cylinder. The weight of the 50 ml ink obtained makes it possible to state how much foam is present in the ink. The greater the weight, the less foam the ink contains. The comparison antifoaming agent used was a commericial defoamer containing 65 wt % polyglycerine polyalkylene glycol ester and 35 wt % residue from oxo alcohol synthesis (oxo oil). Table III states which defoamers presented flow disturbances, and which inks contained more or less foam.

TABLE III

| Antifoaming Agent | Wt. of 50 mL | Flow Disturbances |
|---|---|---|
| None | 38.0 g | None |
| From Ex. 1 | 62.0 g | Slight disturbance |
| From Ex. 3 | 55.2 g | No disturbances |
| From Ex. 4 | 55.8 g | No disturbances |
| Comparison Example | 52.1 g | No disturbances |

What is claimed is:

1. A process for controlling foam in an aqueous medium comprising adding to said aqueous medium a foam-controlling amount of at least one alkadienyl ether selected from the group consisting of alkadienyl ethers of monosaccharides, disaccharides and alkyl glucosides.

2. The process of claim 1 wherein said alkadienyl ether is an alkadienyl ether of glucose.

3. The process of claim 1 wherein said alkadienyl ether is an alkadienyl ether of sucrose.

4. The process of claim 1 wherein said alkyl glucoside is methyl glucoside.

5. The process of claim 1 wherein said composition is a mixture of octadienyl ethers of a monosaccharide having an average degree of etherification of from about 1.3 to about 4.0.

6. The process of claim 5 wherein said monosaccharide is glucose.

7. The process of claim 6 wherein said average degree of etherification is from about 1.3 to about 2.5.

8. The process of claim 7 wherein said average degree of etherification is about 1.5.

9. The process of claim 7 wherein said average degree of etherification is about 2.5.

10. The process of claim 1 wherein said composition is a mixture of octadienyl ethers of a disaccharide having an average degree of etherification of from about 1.5 to about 7.0.

11. The process of claim 10 wherein said disaccharide is sucrose.

12. The process of claim 11 wherein said average degree of etherification is from about 3.0 to about 6.5.

13. The process of claim 11 wherein said average degree of etherification is about 5.5.

14. The process of claim 1 wherein said composition is a mixture of octadienyl ethers of an alkyl glucoside having an average degree of etherification of from about 1.3 to about 3.5.

15. The process of claim 14 wherein said alkyl glucoside is methyl glucoside.

16. The process of claim 15 wherein said average degree of substitution is from about 1.5 to about 3.0.

17. A process for controlling foam in an aqueous medium comprising adding to said aqueous medium a foam-controlling amount of a composition comprised of glucose di-octadienyl ether and glucose tri-octadienyl ether.

18. A process for controlling foam in an aqueous medium comprising adding to said aqueous medium a foam-controlling amount of a composition comprised of sucrose tetra-octadienyl ether and sucrose penta-octadienyl ether.

19. A process for controlling foam in an aqueous medium comprising adding to said aqueous medium a foam-controlling amount of a composition comprised of methyl glucoside di-octadienyl ether and methyl glucoside tri-octadienyl ether.

* * * * *